(12) United States Patent
Aucsmith

(10) Patent No.: US 6,532,194 B2
(45) Date of Patent: Mar. 11, 2003

(54) METHOD AND APPARATUS FOR PROVIDING CERTIFIED TIME

(75) Inventor: David Wayne Aucsmith, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/191,991

(22) Filed: Jul. 8, 2002

(65) Prior Publication Data

US 2002/0181332 A1 Dec. 5, 2002

Related U.S. Application Data

(63) Continuation of application No. 09/127,572, filed on Jul. 31, 1998.

(51) Int. Cl.[7] .................. G04B 47/00; G04C 11/02; H04L 9/00

(52) U.S. Cl. .................. 368/10; 368/47; 705/67; 713/173; 713/178

(58) Field of Search .................. 368/10, 46, 47; 705/59, 65, 67; 713/170, 173, 175, 178

(56) References Cited

U.S. PATENT DOCUMENTS 4,582,434 A * 4/1986 Plangger et al. .......... 368/46
6,253,322 B1 * 6/2001 Susaki et al. .......... 713/710

* cited by examiner

*Primary Examiner*—Vit Miska
(74) *Attorney, Agent, or Firm*—Blakely, Sokoloff, Taylor & Zafman LLP

(57) ABSTRACT

An integrated circuit includes: a digital signature module coupled in the integrated circuit so as to receive a time of day signal string from a clock module and digitally sign the signal string.

14 Claims, 1 Drawing Sheet

METHOD AND APPARATUS FOR PROVIDING CERTIFIED TIME

This is a Continuation Patent Application of U.S. patent application Ser. No. 09/127,572, filed Jul. 31, 1998, titled, "Method and Apparatus for Providing Certified Time," by David W. Aucsmith, assigned to the assignee of the present invention and herein incorporated by reference.

BACKGROUND

1. Field

The invention relates to providing accurate time and, more particularly, to providing accurate time that has been certified.

2. Background Information

In a variety of situations, particularly in connection with a computer or personal computer (PC), it is desirable to have an accurate measurement of the time of day, referred to hereinafter as the time. However, in environments in which computers and PCs are employed, difficulties may arise in attaining accurate measurements of the time. For example, if the PC power is down, this may affect the accurate measurement desired. Likewise, unscrupulous individuals may deliberately attempt to interfere with an accurate measurement of the time for one reason or another.

Typically, current solutions for attaining an accurate measurement of the time of day involve either a network connection or having power continually available. Unfortunately, both of these approaches are typically vulnerable to attack and, therefore, may not appropriately accommodate a wide variety of computer and PC applications. A need, therefore, exists for another apparatus or technique for obtaining an accurate measurement of the time of day that reduces or avoids these disadvantages.

SUMMARY

In accordance with one embodiment of the invention, an integrated circuit includes: a digital signature module coupled in the integrated circuit so as to receive a time of day signal string from a clock module and digitally sign the signal string.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
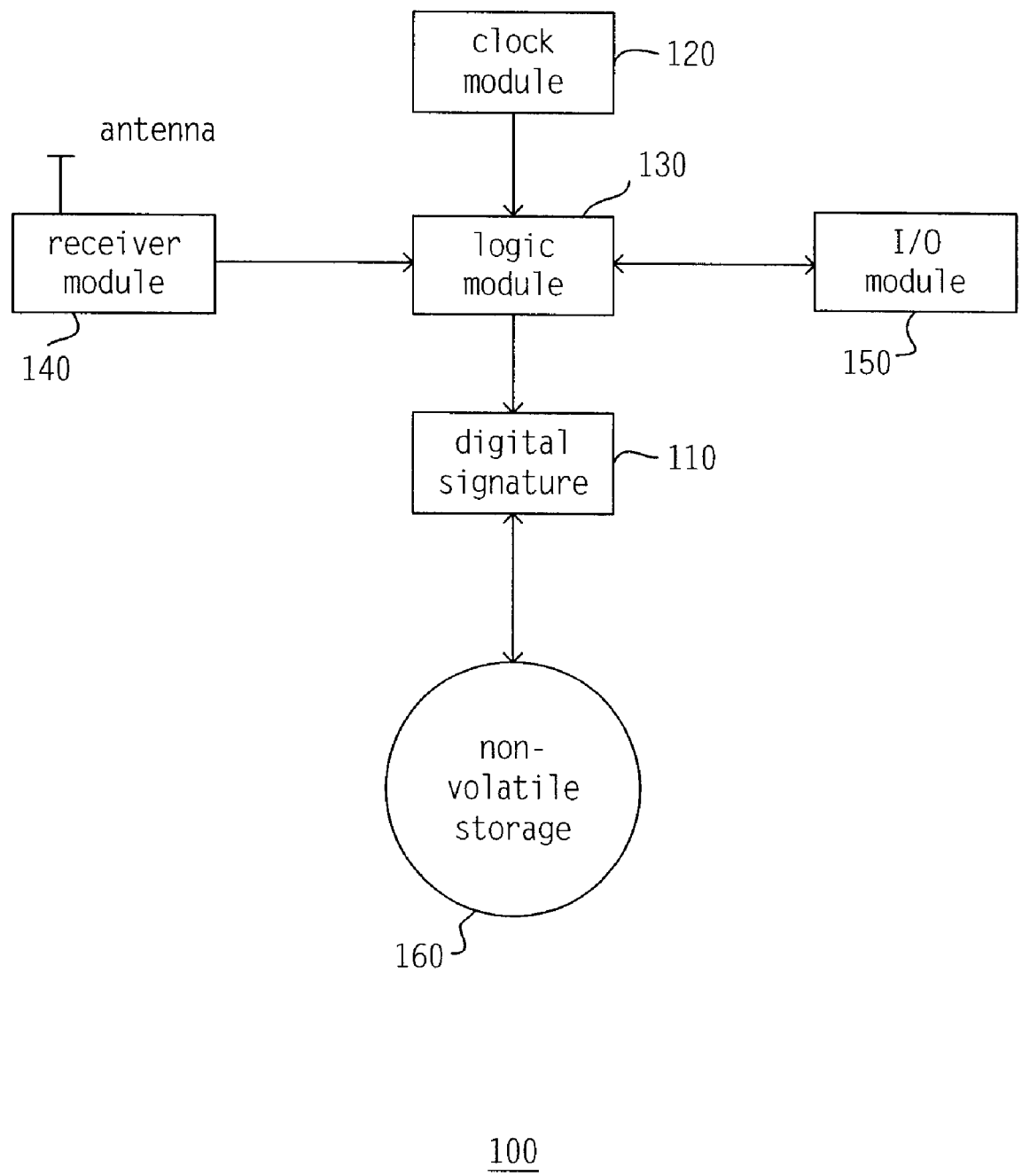
FIG. 1 is a block diagram illustrating an embodiment of an apparatus for providing certified time in accordance with the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

An embodiment in accordance with the invention provides a method and apparatus for generating authenticated, accurate time of day signal information that may be read and used by other computer programs or devices. This particular embodiment is substantially immune to normal power interruption and is resistant to sophisticated tampering. Likewise, the particular embodiment to be described will not report an incorrect time as a failure condition.

FIG. 1 is a block diagram illustrating an embodiment 100 of an apparatus for providing certified time in accordance with the present invention. Although the scope of the invention is not limited in this respect, FIG. 1 illustrates this particular apparatus as embodied on an integrated circuit. Of course, alternative embodiments in accordance with the present invention may be employed. For example, one embodiment of the invention might include software resident on a storage medium capable to performing operations in accordance with the present invention, such as those described herein. Of course, in an embodiment implemented in software, modules are communicatively coupled, as opposed to being electrically coupled, for example.

This particular embodiment includes a digital signature module 110. Furthermore, digital signature module 110 is coupled in the integrated circuit so as to receive a time of day signal string from a clock module, such as clock module 120 illustrated in FIG. 1. It will, of course be appreciated that for the embodiment illustrated, although the invention is not limited in scope in this respect, the time of day signal string is provided to digital signature module 110 from clock module 120 via logic module 130. The operations of these modules shall be explained in greater detail below. However, as the previous description illustrates, at least for the embodiment illustrated in FIG. 1, although clock module 120 is coupled to signature module 110 in this particular embodiment, this coupling is indirect in that it occurs via logic module 130. Digital signature module 110, in addition, digitally signs the signal string obtained from clock module 120 via logic module 130. In this context, digitally signing a signal string refers to encrypting the cryptographic hash value of the signal string being signed. Typically, this encryption may be accomplished using a private key having a corresponding public key that may be employed to reverse or undo the encryption. It will, of course, be appreciated that logic module 130 may alter the signal string obtained from clock module 120 before it is provided to digital signature module 110, as also explained in more detail below.

In this particular embodiment, clock module 120 generates the time of day signal. Such mechanisms are common as single chip packages, although, of course, the invention is not limited in scope in this respect. One such example includes an on-board PC clock. As illustrated further in FIG. 1, embodiment 100 includes a radio receiver module in this embodiment coupled to clock module 120 via, as previously described, logic module 130. Logic module 130 is adopted to update the clock module with the time signal received from the radio receiver module. This is illustrated in FIG. 1 in that receiver module 140 is directly coupled to logic module 130. Nonetheless, of course, the invention is not limited in scope to this particular embodiment. For example, in an alternative embodiment, receiver module 140 might be directly coupled to clock module 120, and various other configuration schemes might be employed in alternative embodiments in accordance with the present invention.

Although the invention is not limited in scope in this particular respect, radio receiver module 140 is adapted to receive an extremely low frequency (ELF) time broadcast, such as those generated by the National Institutes of Standards and Technology (NIST) broadcast station WWVB located on the WWV site near Fort Collins, Colo. Although, of course, the invention is not limited in scope to employing this particular time broadcast signal, nonetheless, WWVB continuously broadcasts time and frequency signals at 60 kilohertz, primarily for the continental United States. WWVB does not broadcast voice announcements, but provides standard time information including the year, time intervals, daylight savings time, leap second and leap year indicators, and UT1 corrections by means of a binary coded decimal (BCD) time code. In addition, a 60 kilohertz carrier frequency provides an accurate frequency standard that is referenced to the NIST frequency standard. Likewise, ELF transmissions may be received in almost any location, including underground, and are generally more difficult to spoof due at least in part to power and antennae constraints imposed by the transmitter, as is well-known. Likewise, single chip receivers are currently available, such as watch and clock movements, including an antenna.

In this particular embodiment, although the invention is not necessarily limited in scope in this respect, the logic module is adapted to allow the clock module to provide a time signal to the digital signature module only if the logic module has received from the radio receiver module signal information providing it the capability to update the clock module time signal within a predetermined amount of time. Of course, in an alternative embodiment, such as where the receiver module is directly coupled to the clock module, the clock module may perform the update itself and the logic module may allow the clock module to be provided as a time signal to the digital signature module only if it detects that the clock module time signal has been updated within a predetermined amount of time. Similar comments apply to applying power to the integrated circuit, More specifically, the logic module may be adapted to allow the clock module on power-up of the integrated circuit to provide a time signal only if the logic module has been updated by the radio receiver module, although, in an alternative embodiment, it may be the clock module that is actually updated.

FIG. 1 also illustrates a non-volatile memory or storage unit 160. In this particular embodiment, an non-volatile storage unit includes an RSA public-private key pair for the integrated circuit stored as binary digital signals. RSA is a public-private key crypto or encryption system invented in 1977 by Ron Rivest, Adi Shamir, and Leonard Adleman. Of course, the invention is not limited in scope in this respect. For example, a storage module other than a non-volatile storage module may be employed and a cryptographic key pair other than an RSA private-public key pair may be employed. However, in this particular embodiment, the RSA private-public key pair is to be used by the digital signature module to sign the time string, as illustrated by the coupling between storage module 160 and digital signature module 110. Furthermore, in this particular embodiment, the non-volatile storage or memory module also has stored a digital certificate for the integrated circuit. In this particular embodiment, the certificate for the integrated circuit includes the serial number for the integrated circuit, the public key for the manufacturer of the integrated circuit, and a digital signature for the manufacturer of the integrated circuit. Of course, alternative embodiments need not include such a digital certificate and, furthermore, alternative digital certificates may be employed. For example, a digital signature and public key for an entity or individual other than the manufacturer of the integrated circuit might be included.

In this particular embodiment, interface module 150 is likewise included as illustrated in FIG. 1. Interface module 150 is adapted in this particular embodiment to respond to a signal request for either an identification of the integrated circuit or the current time. Therefore, if a signal request for an identification of the integrated circuit occurs, the interface module is adapted to respond to the signal request by providing the integrated circuit digital certificate. Likewise, if the signal request for the current time occurs, the interface module is adapted to respond by providing the time signal and the digital signature of the time signal. Of course, alternative embodiments need not include this particular interface module. For example, an interface may only be adapted to respond to a signal request for the current time and, therefore, respond by providing the time signal and the digital signature of the time signal.

In this particular embodiment, although the invention is not limited in scope in this respect, the integrated circuit operates as an autonomous unit. Requests for time of day signal information are satisfied as an atomic operation. Thus, the integrated circuit is a single package solution to authenticated time of day services. The receiver module receives the correct time of day signal and continually updates the clock module via the logic module in this particular embodiment. When the interface modules receives requests for current time of day signal information, it retrieves the time signal from the clock module and passes the time signal string through the digital signature module. It then provides the time signal string and the associated digital signature. Nonetheless, an embodiment in accordance with the invention may not include all the modules previously described in this embodiment. For example, an embodiment may only employ a digital signature module and a clock module; however, in other embodiments, additional modules may also be provided.

Although the invention is not limited in scope in this respect, an embodiment in accordance with the present invention may be employed as a replacement for a PC's clock chip or as an add-in chip in other devices other than a PC or computer, such as, for example, surveillance equipment. It may also be a part of a network interface card or another add-in card for machines that may utilize such time services. Authenticated time is a desirable feature in a variety of transactions, particularly those that employ the concept of trust. For example, where digital notary services are employed, authenticated time may be desirable.

An embodiment of a method of providing certified time in accordance with the invention may include the following. A time-of-day signal string may be generated. The time-of-day signal string may be digitally signed. For example, the embodiment illustrated in FIG. 1, as previously described, may implement this particular embodiment. Likewise, the time-of-day signal string may be updated, such as by using a time broadcast signal. This may occur in an embodiment prior to digitally signing the time-of-day signal string. Of course, other embodiments are possible in accordance with the invention. For example, in an embodiment, the time broadcast signal may comprise an ELF time signal, as previously described, although the invention is not limited in scope in this respect. Likewise, in one embodiment, the time-of-day signal string may only be signed if it has been updated within a predetermined amount of time.

While certain features of the invention have been illustrated as described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. An integrated circuit comprising:

a digital signature module coupled in said integrated circuit so as to receive a time-of-day signal string from a clock module and digitally sign the signal string; and further comprising the clock module to generate the time-of-day signal; and further comprising a logic module and a radio receiver module;

the radio receiver being adapted to receive a time broadcast signal; and the logic module being adapted to update the clock module with a time signal received from the radio receiver module, wherein the logic module is adapted to allow the clock module to provide a time signal only if the logic module has been updated from the radio receiver module within a predetermined amount of time.

2. The integrated circuit of claim 1, wherein the radio receiver module is adapted to receive an extremely low frequency (ELF) time signal.

3. The integrated circuit of claim 1, wherein the ELF time signal comprises an ELF time signal generated by the National Institute of Standards and Technology broadcast station WWVB.

4. The integrated circuit of claim 1, and further comprising a non-volatile storage module;

said non-volatile storage module storing a private-public key pair to be used by the digital signature module to sign the time string.

5. The integrated circuit of claim 4, wherein said public-private key pair comprises an RSA public-private key pair.

6. The integrated circuit of claim 4, wherein the non-volatile memory module further has stored a digital certificate for said integrated circuit, said digital certificate for said integrated circuit including a serial number for said integrated circuit, a public key for the manufacturer of the integrated circuit, and a digital signature for the manufacturer of the integrated circuit.

7. The integrated circuit of claim 6, and further comprising an interface module;

said interface module being adapted to respond to a signal request for one of an identification of said integrated circuit and the current time.

8. The integrated circuit of claim 7, wherein said interface module is adapted to respond to a signal request for an identification of said integrated circuit by providing the integrated circuit digital certificate.

9. The integrated circuit of claim 7, wherein said interface module is adapted to respond to a signal request for the current time by providing the time signal and the digital signature of the time signal.

10. The integrated circuit of claim 1, and further comprising an interface module;

said interface module being adapted to respond to a signal request for the current time.

11. The integrated circuit of claim 10, wherein said interface module is adapted to respond to a signal request for the current time by providing the time signal and the digital signature of the time signal.

12. An integrated circuit comprising:

a digital signature module coupled in said integrated circuit so as to receive a time-of-day signal string from a clock module and digitally sign the signal string; and further comprising the clock module to generate the time-of-day signal; and further comprising a logic module and a radio receiver module;

the radio receiver being adapted to receive a time broadcast signal; and the logic module being adapted to update the clock module with a time signal received from the radio receiver module, wherein the logic module is adapted to allow the clock module on power up of the integrated circuit to provide a time signal only if the logic module has been updated by the radio receiver module.

13. A method of providing certified time comprising:

generating a time-of-day signal string; and digitally signing the time-of-day signal string; and further comprising:

updating the time-of-day signal string using a time broadcast signal prior to digitally signing the time-of-day signal string, wherein digitally signing the time-of-day signal string comprises digitally signing the time of day signal string only if the time of day signal string has been updated within a predetermined amount of time.

14. The method of claim 13, wherein the time broadcast signal comprises an extremely low frequency (ELF) time signal.

* * * * *